(12) United States Patent
Wu

(10) Patent No.: US 7,063,340 B1
(45) Date of Patent: Jun. 20, 2006

(54) FOLDING COLLAPSIBLE GOLF CART

(76) Inventor: David Wu, No. 35-1, Jih Hsin Street, Tu Cheng City, Taipei Hsien (TW)

(*) Notice: Subject to any disclaimer, the term of this patent is extended or adjusted under 35 U.S.C. 154(b) by 60 days.

(21) Appl. No.: 10/694,897

(22) Filed: Oct. 29, 2003

(51) Int. Cl.
B62B 1/12 (2006.01)

(52) U.S. Cl. .............................. 280/47.26; 280/47.18; 280/47.24; 280/47.34

(58) Field of Classification Search .......... 280/DIG. 5, 280/DIG. 6, 38, 42, 47.17, 47.26, 47.315, 280/645, 646, 648, 652, 655, 655.1; 224/274; 292/DIG. 37, 32, 106, 137, 150, 302; 248/96
See application file for complete search history.

(56) References Cited

U.S. PATENT DOCUMENTS

| 2,619,360 | A | * | 11/1952 | Alter | 280/42 |
| 4,657,100 | A | * | 4/1987 | Lewis | 180/19.1 |
| 4,784,401 | A | * | 11/1988 | Raguet | 280/40 |
| 4,946,186 | A | * | 8/1990 | Cheng | 280/646 |
| 5,857,684 | A | * | 1/1999 | Liao et al. | 280/40 |
| 5,966,786 | A | * | 10/1999 | Bowling | 27/2 |
| 6,435,539 | B1 | * | 8/2002 | Wu | 280/652 |

* cited by examiner

Primary Examiner—Christopher Ellis
Assistant Examiner—John Walters
(74) Attorney, Agent, or Firm—Troxell Law Office, PLLC

(57) ABSTRACT

A folding collapsible golf cart, in which the folding-control rod member is allowed to be received to a bottom frame after unlocking of the locking device for enabling the upper and lower main shafts and the links to be folded up and received to the folding-control rod member and the bottom frame between the wheels.

5 Claims, 11 Drawing Sheets

FOLDING COLLAPSIBLE GOLF CART

BACKGROUND AND SUMMARY OF THE INVENTION

The present invention relates to a folding collapsible golf cart and, more particularly, to such a folding collapsible golf cart, which enables the upper and lower main shafts as well as the links to be received to the bottom frame between the wheels when unlocked a folding-control rod member.

Regular golf carts include motor-driven type golf carts and hand-push type golf carts. FIG. 1 shows a conventional motor-driven type golf cart 91. Due to the arrangement of an additional front wheel 911 and a motor drive 912, this structure of motor-driven type golf cart 91 is bulky and heavy, not convenient for packing and delivery. When folded up the upper main shaft 913 and the lower main shaft 914, the collapsed golf car 91 still occupy much storage space. FIG. 2 shows a conventional hand-push type golf cart 92. According to this design, the upper main shaft 921 and the lower main shaft 922 can be folded up when unlocked the lock 920. When folding the upper and lower main shafts 921 and 922, the links 923 and 924 will be forced to move the two wheel holder frames 925 and 926 toward each other. The folding operation of this structure of golf cart is still not convenient. Further, when folded up, the collapsed golf cart still occupies much storage space.

The present invention has been accomplished under the circumstances in view. It is the main object of the present invention to provide a folding golf cart, which can conveniently smoothly be folded up. It is another object of the present invention to provide a folding golf cart, which keeps the major parts received in between the wheels to minimize space occupation. According to one aspect of the present invention, the folding golf cart comprises a folding-control rod member and a locking device adapted to lock the folding-control rod member. When unlocked the locking device, the folding-control rod member can then be turned and received to the bottom frame, for enabling the upper and lower main shafts and the links to be received to the folding-control rod member and the bottom frame between the wheels.

DETAILED DESCRIPTION OF THE PREFERRED EMBODIMENTS

Figure 1:
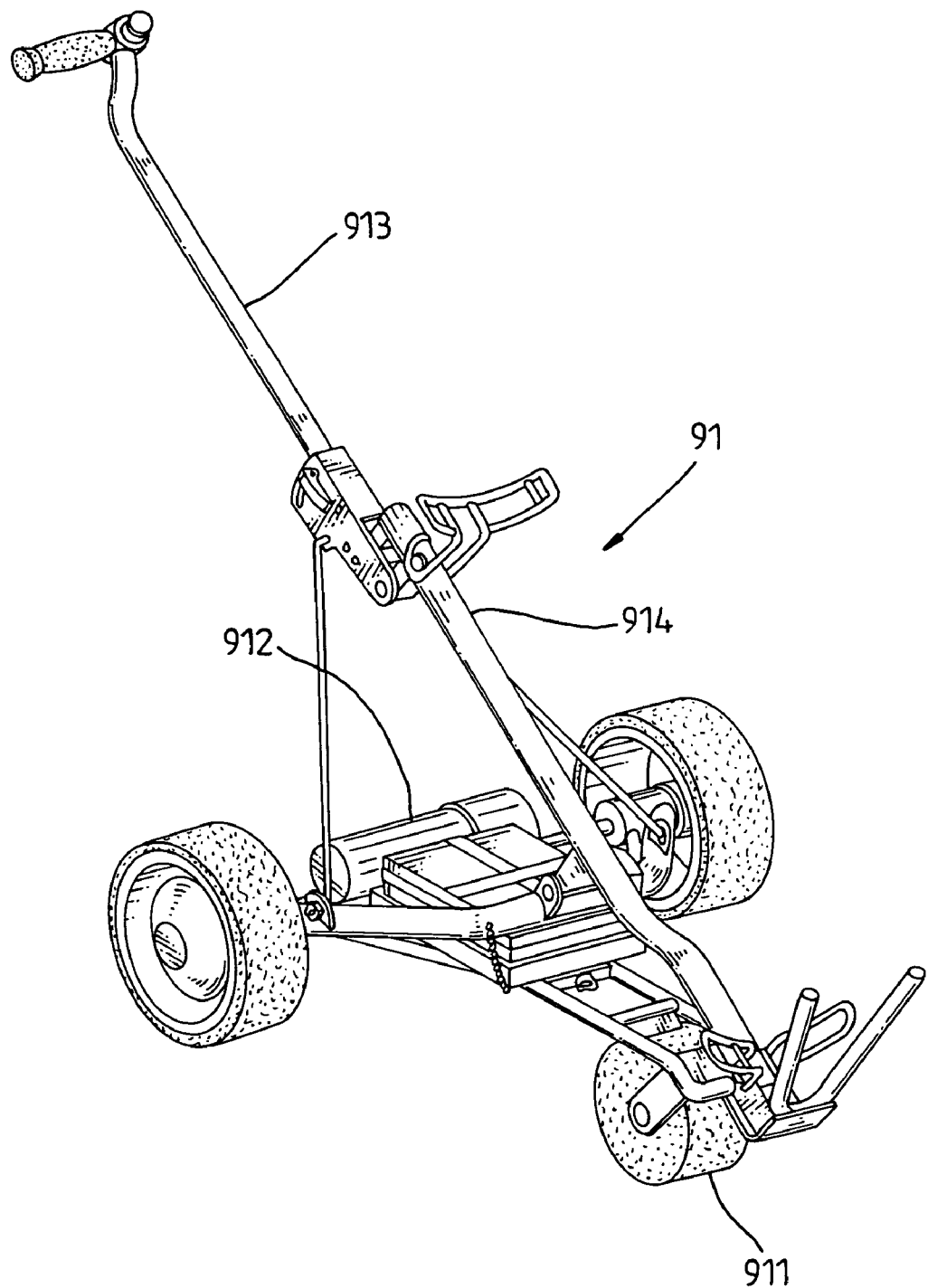
FIG. 1 is a perspective view of a folding collapsible motor-driven type golf cart according to the prior art.
Figure 2:
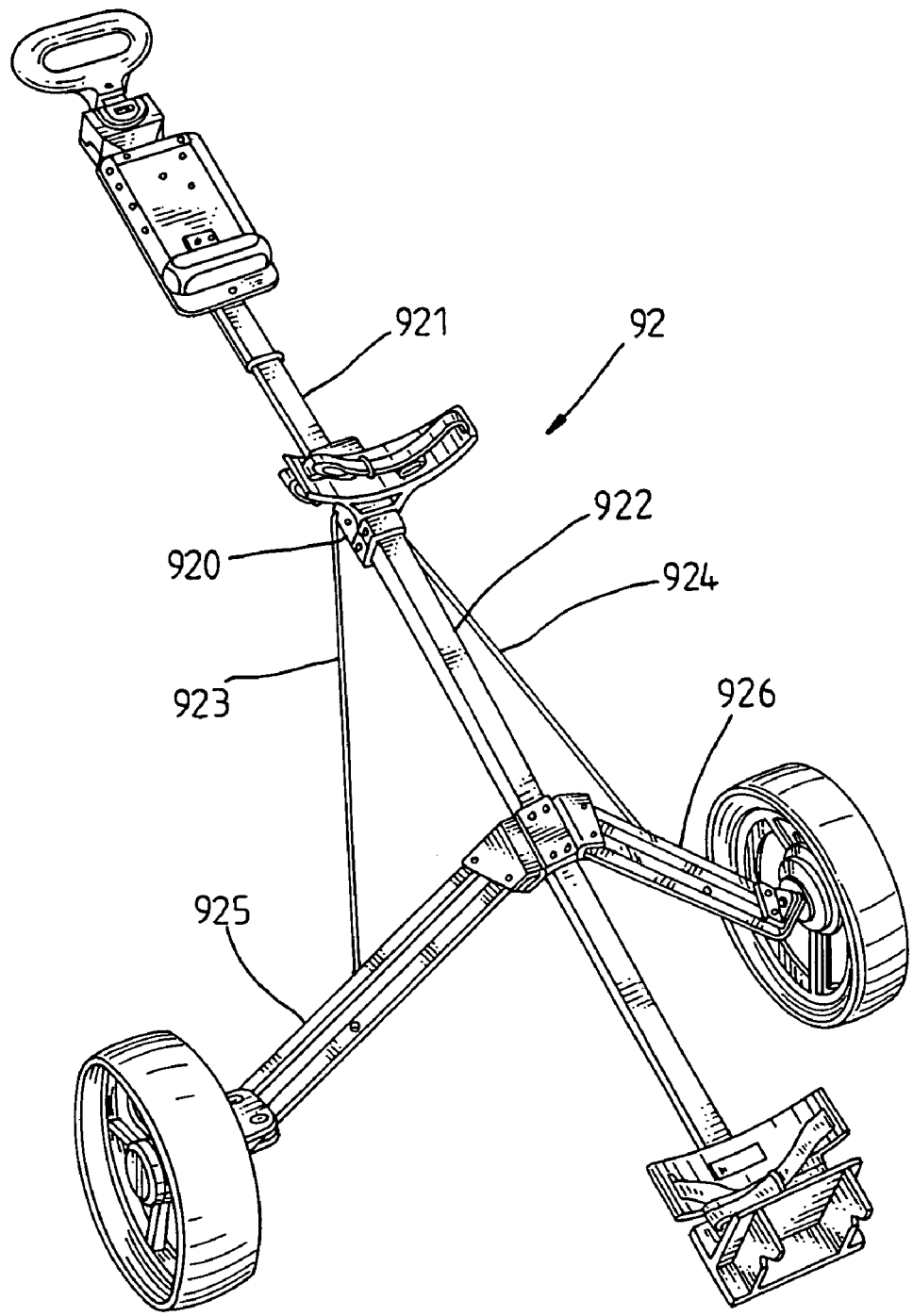
FIG. 2 is a perspective view of a folding collapsible hand-push type golf cart according to the prior art.
Figure 3:
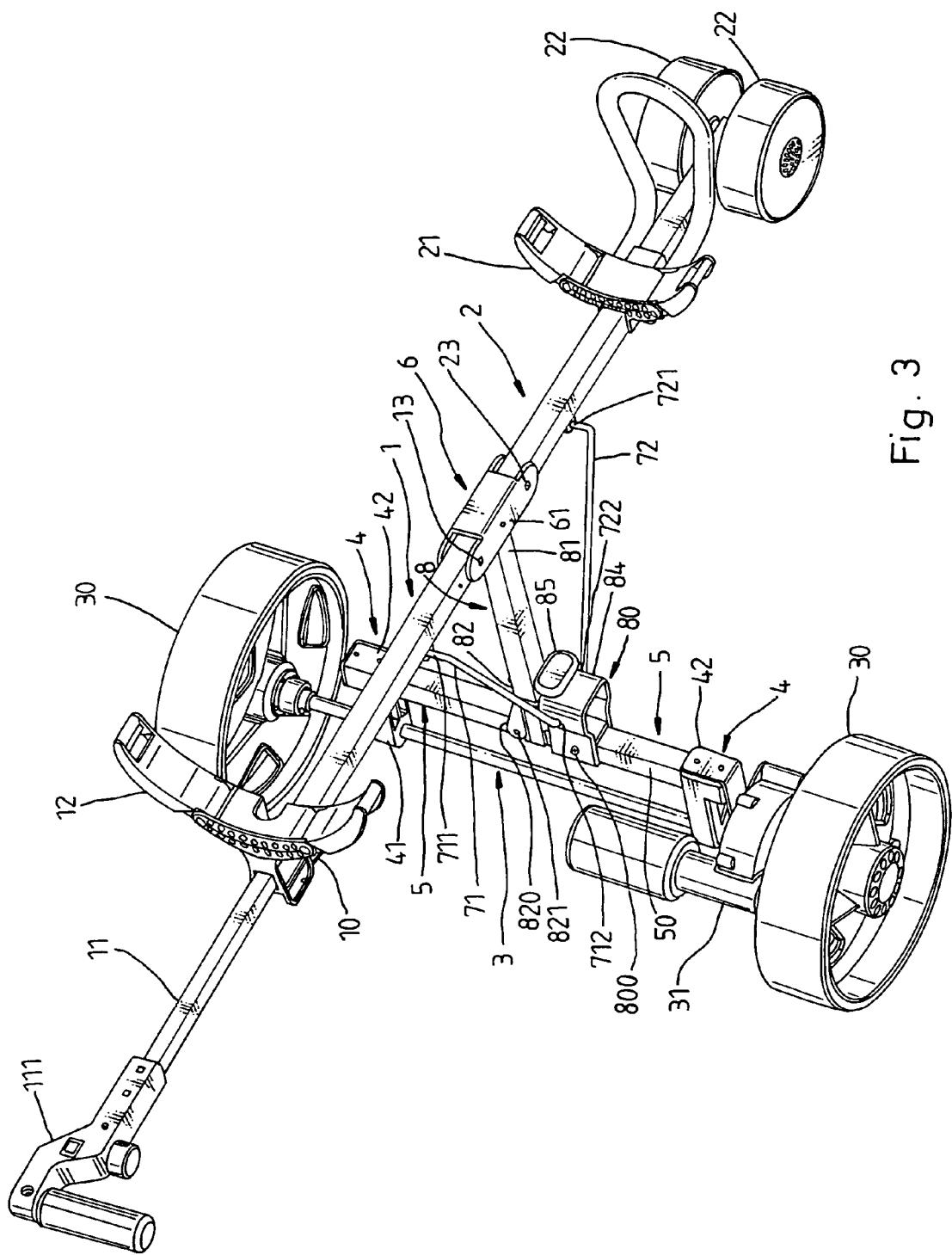
FIG. 3 is a perspective view of a folding collapsible golf cart according to the present invention.
Figure 4:
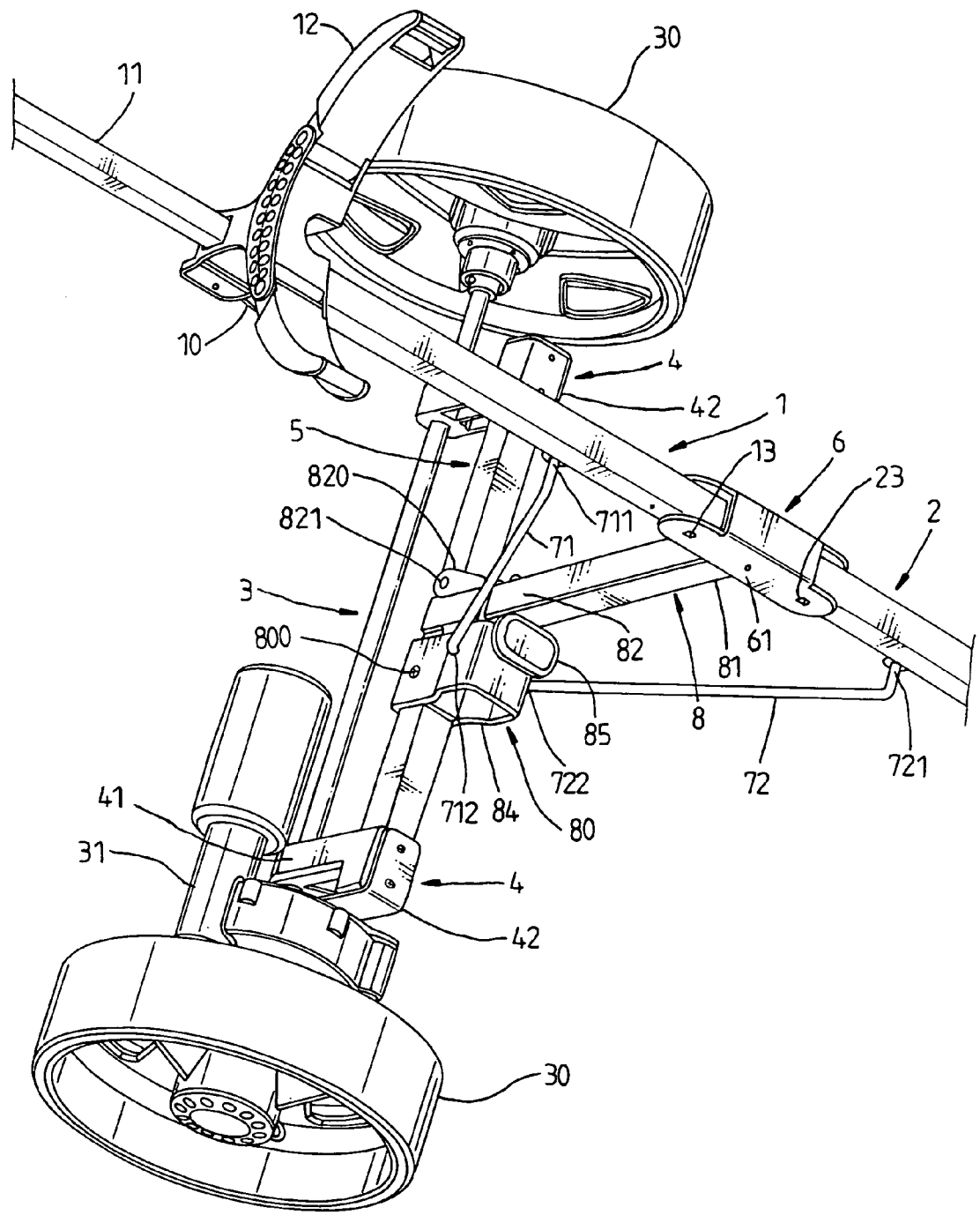
FIG. 4 is an enlarged view of a part of the folding collapsible golf cart according to the present invention.
Figure 5:
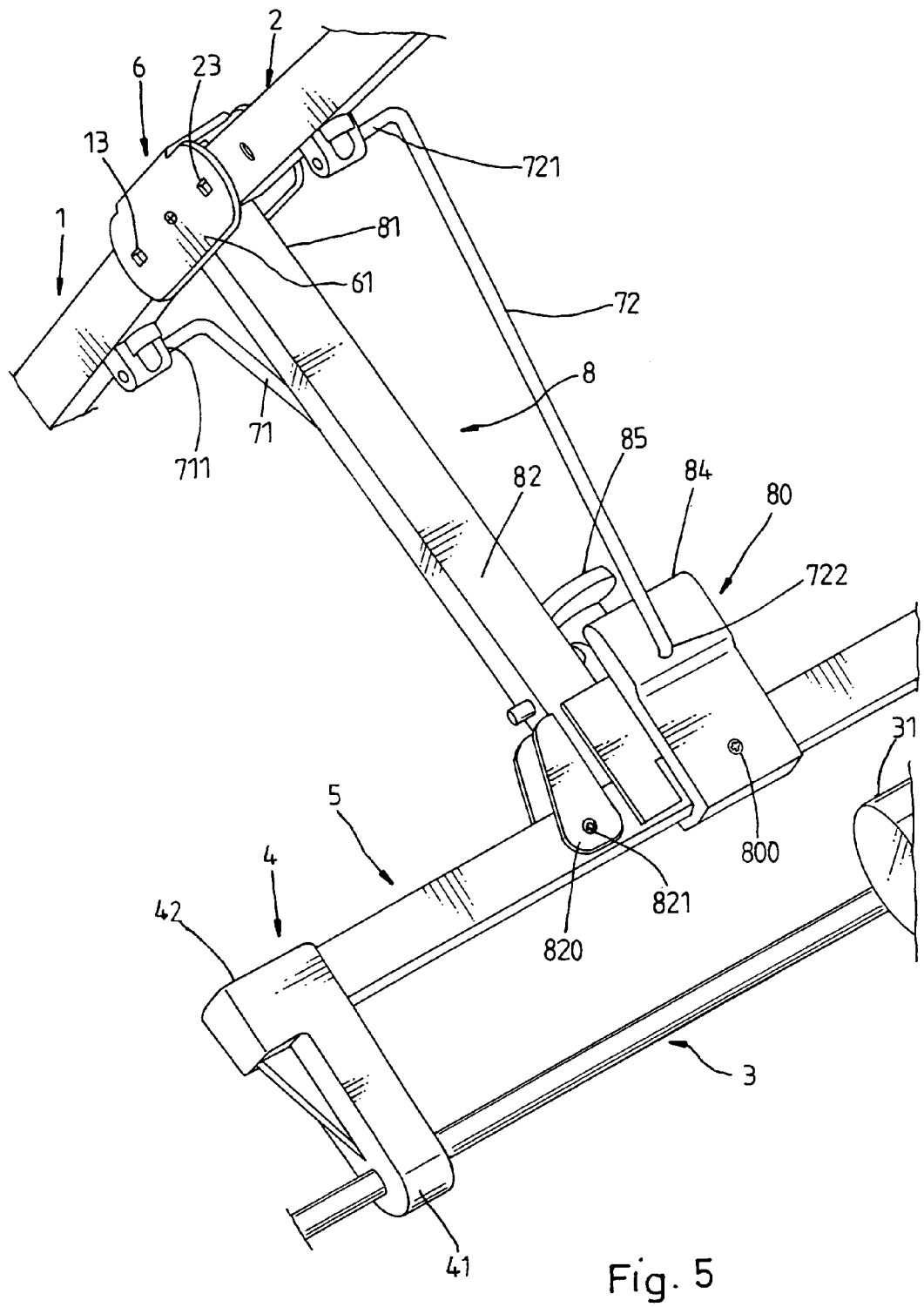
FIG. 5 is an enlarged view of another part of the folding collapsible golf cart according to the present invention.
Figure 6:
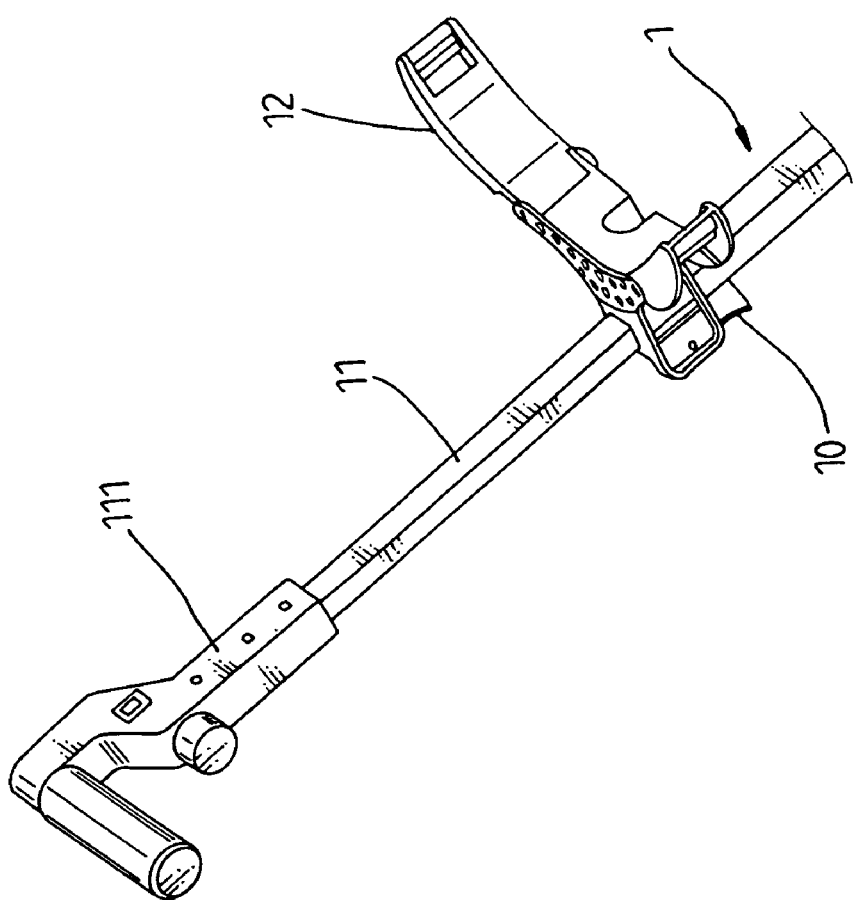
FIG. 6 is a perspective view of still another part of the folding collapsible golf cart according to the present invention.
Figure 7:
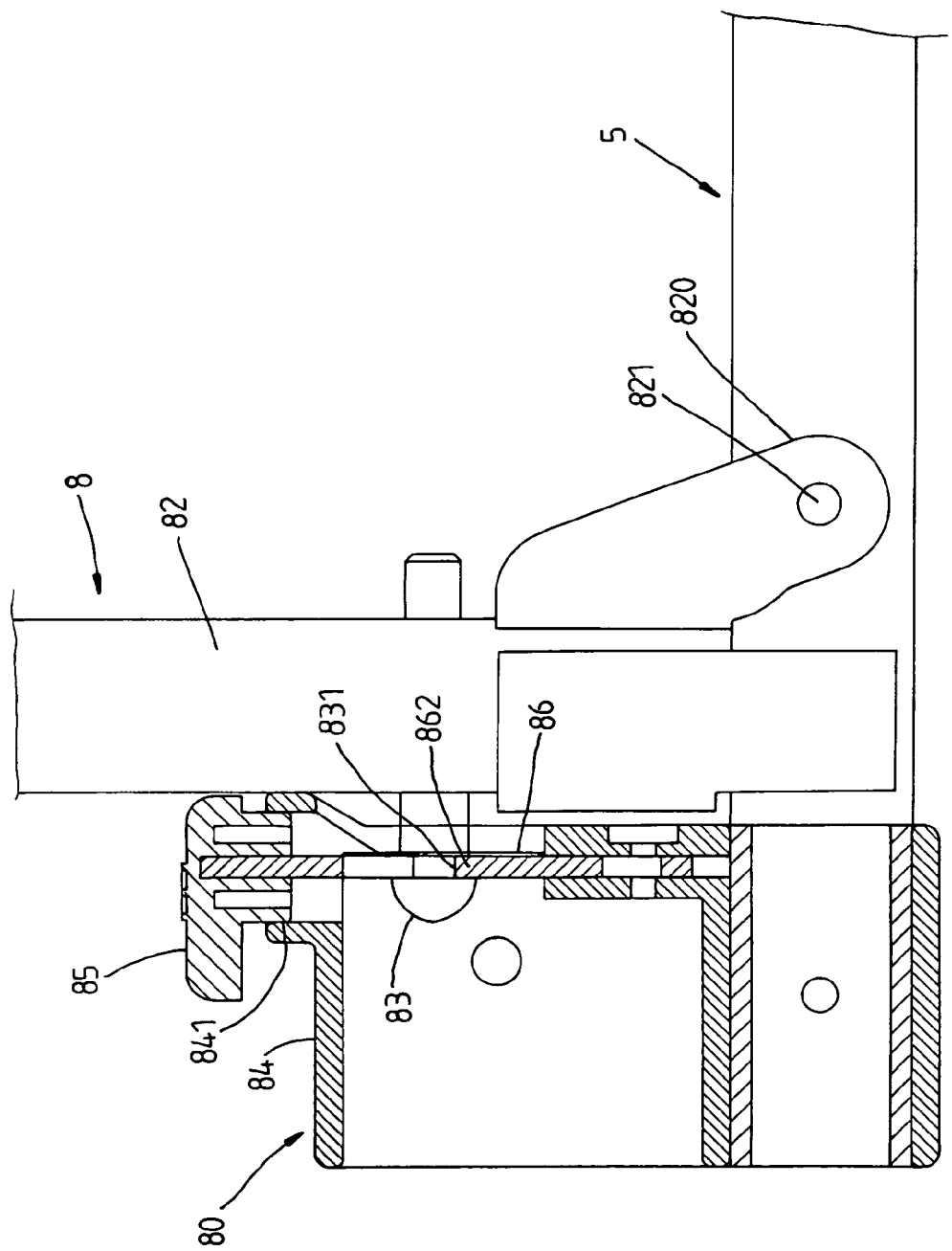
FIG. 7 is a sectional assembly view in an enlarged scale of a part of the folding collapsible golf cart according to the present invention.

Referring to FIGS. 3~6, a folding collapsible golf cart is shown comprising:

a hollow upper main shaft 1;

a handle 11 axially slidably inserted into the upper main shaft 1 from the front side and locked by a lock 10 at the upper main shaft 1 (see FIG. 6), having a grip 111 disposed at one end outside the upper main shaft 1;

an upper bag cradle 12 fixedly provided at the upper main shaft 1;

a lower main shaft 2, the lower main shaft 2 having one end longitudinally pivotally coupled to one end of the upper main shaft 1 remote from the handle 11 and the other end provided with a front wheel assembly 22;

a wheel axle 3 holding a pair of wheels 30 and rotatable by a motor drive 31;

two connecting blocks 4;

a bottom frame 5;

a lower bag cradle 21 fixedly provided at the lower main shaft 2 near the front wheel assembly 22;

a coupling frame 6; and upper and lower links 71 and 72;

wherein:

the upper main shaft 1 has a lower part coupled to one end 711 of the upper link 71, a bottom end pivoted to the upper end of the coupling frame 6 by a pivot 13, and the lower main shaft 2 has an upper part coupled to one end 721 of the lower link 72, a upper end pivoted to the lower end of the coupling frame 6 by a pivot 23;

a folding-control rod member 8 is provided having one end 81 pivotally connected to a middle part 61 of the coupling frame 6, the other end 82 fixedly provided with a side lug 820, which is pivotally coupled to a middle part of the bottom frame 5 by a pivot 821 for enabling the folding-control rod member 8 to be turned and received to the bottom frame 5, and a locating device 83, which can be locked by a locking device 80 to stop the folding-control rod member 8 from moving toward the bottom frame 5;

the links 71 and 72 each have one end 711 or 721 respectively pivoted to the upper main shaft 1 and lower main shaft 2, and the other end 712 or 722 respectively pivoted to two opposite sides of the locking device 80;

the connecting blocks 4 each have a bottom end 41 respectively sleeved onto the wheel axle 3, and a top end 42 respectively fastened to the two distal ends of the bottom frame 5.

Figure 8:
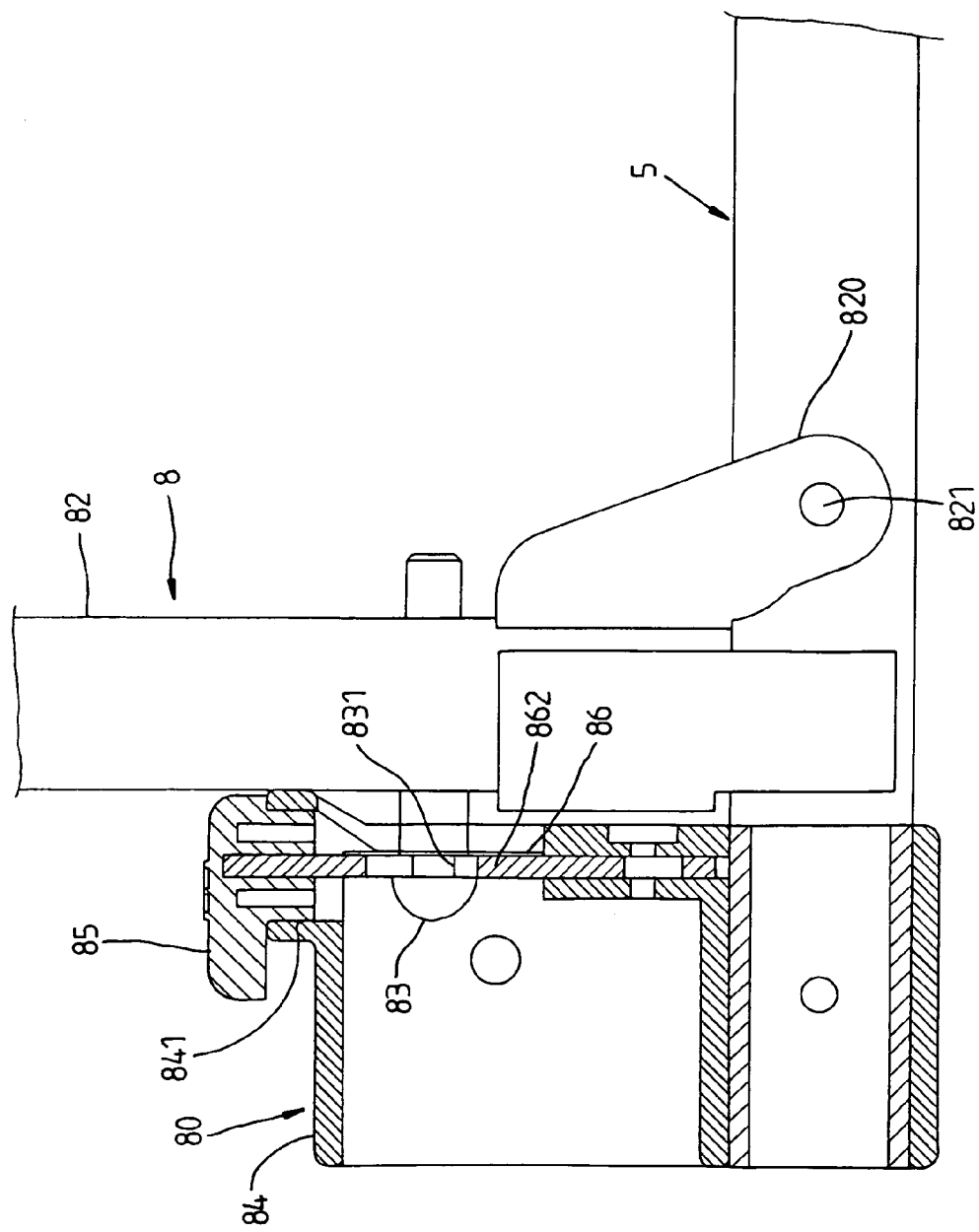
FIG. 8 is similar to FIG. 7 but showing the control button pressed.
Figure 9:
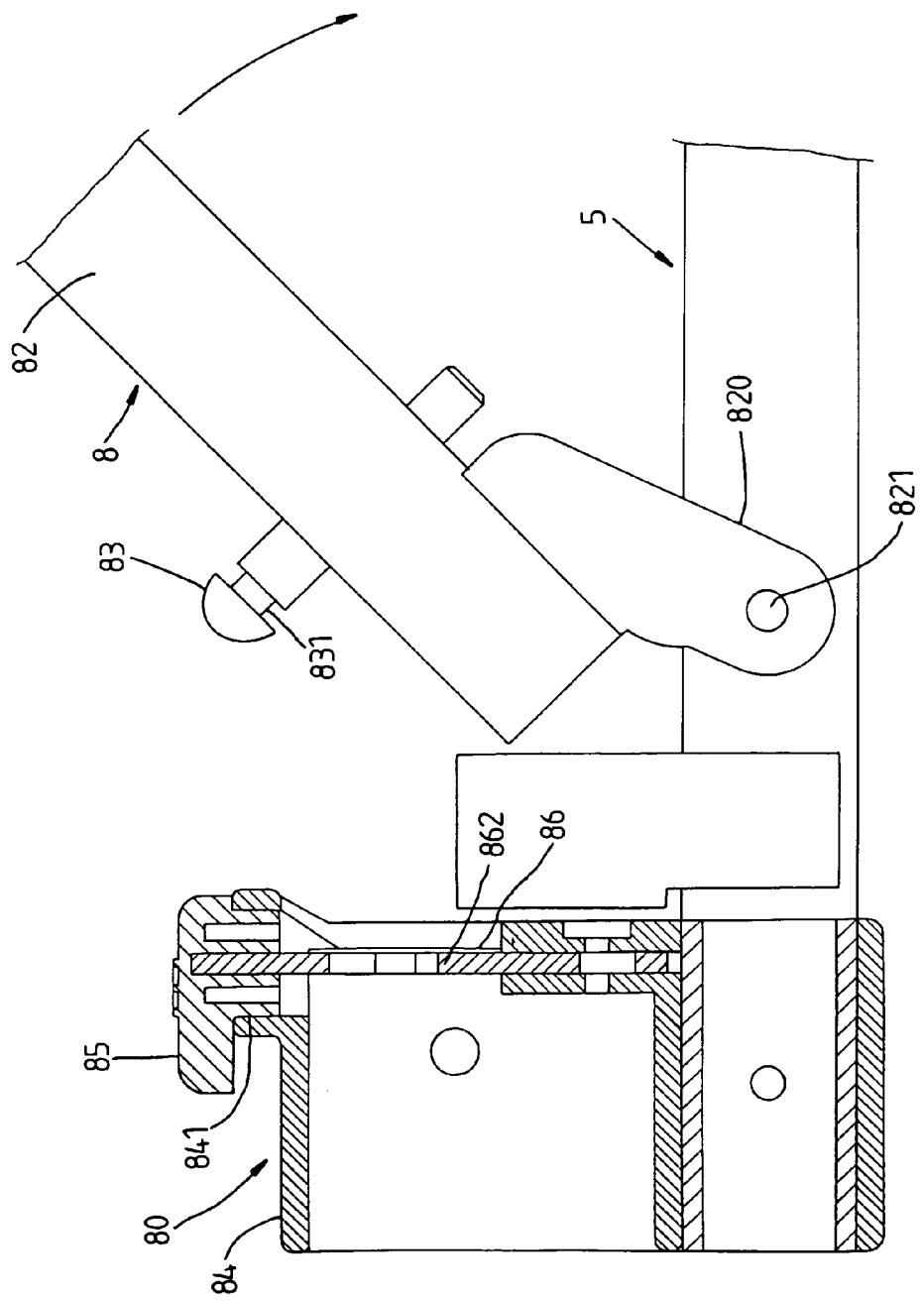
FIG. 9 is similar to FIG. 8 but showing the folding-control rod member turned away from the locking device.
Figure 10:
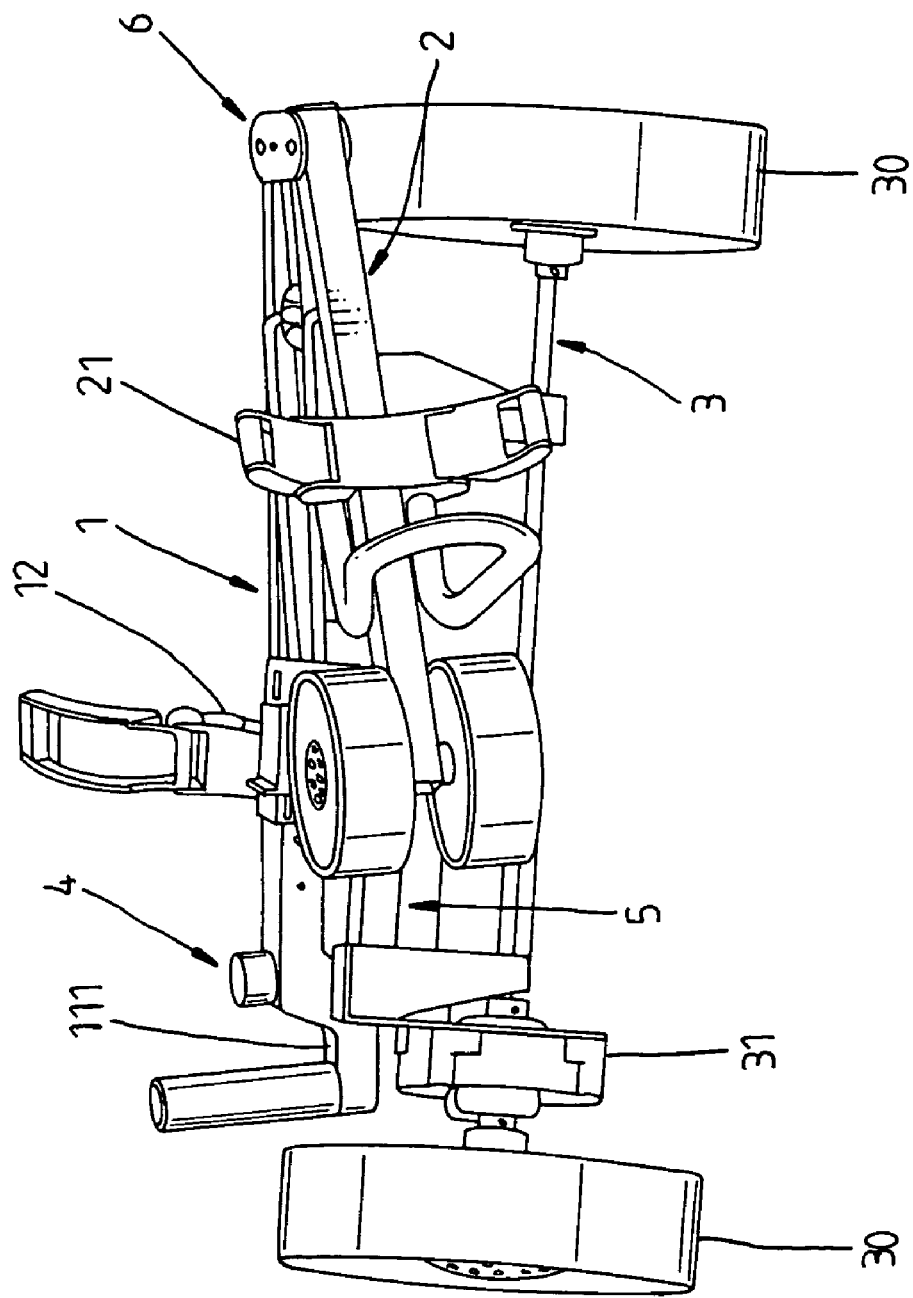
FIG. 10 is a perspective view showing the folding collapsible golf cart collapsed according to the present invention.

When wishing to collapse the golf cart, unlock the lock 10 for enabling the handle 11 to be received in the upper main shaft 1, and then unlock the locking device 80 to release the locating device 83 of the folding-control rod member 8 (see FIG. 8), for enabling the rod member 8 to be received to the bottom frame 5 (see FIG. 9), and then turn the upper and lower main shafts 1 and 2 and the links 71 and 72 downwards and received to the folding-control rod member 8 and the bottom frame 5.

Referring to FIGS. 5 and 7–9, the locating device 83 of the folding-control rod member 8 is a cylindrical member insertable into the locking device 80, having a locating groove 831 extended around the periphery. The locking device 80 comprises a casing 84 fixedly fastened to one side 50 of the bottom frame 5 by a fastening member 800, a control button 85 movable in the sliding slot 841, and a locking plate 86 extended from the control button 85. The casing 84 has a sliding slot 841. The locking plate 86 has an engagement device 862 adapted to engage the locating groove 831 of the locating device 83. When moving the control button 85 upwardly, the engagement device 862 will be forced into engagement with the locating groove 831 of the locating device 83 to lock the folding-control rod member 8. On the contrary, when moving the control button 85 downwardly, the engagement device 862 will be disengaged from the locating groove 831 of the locating device 83, for enabling the folding-control rod member 8 to be turned toward the bottom frame 5.

Figure 11:
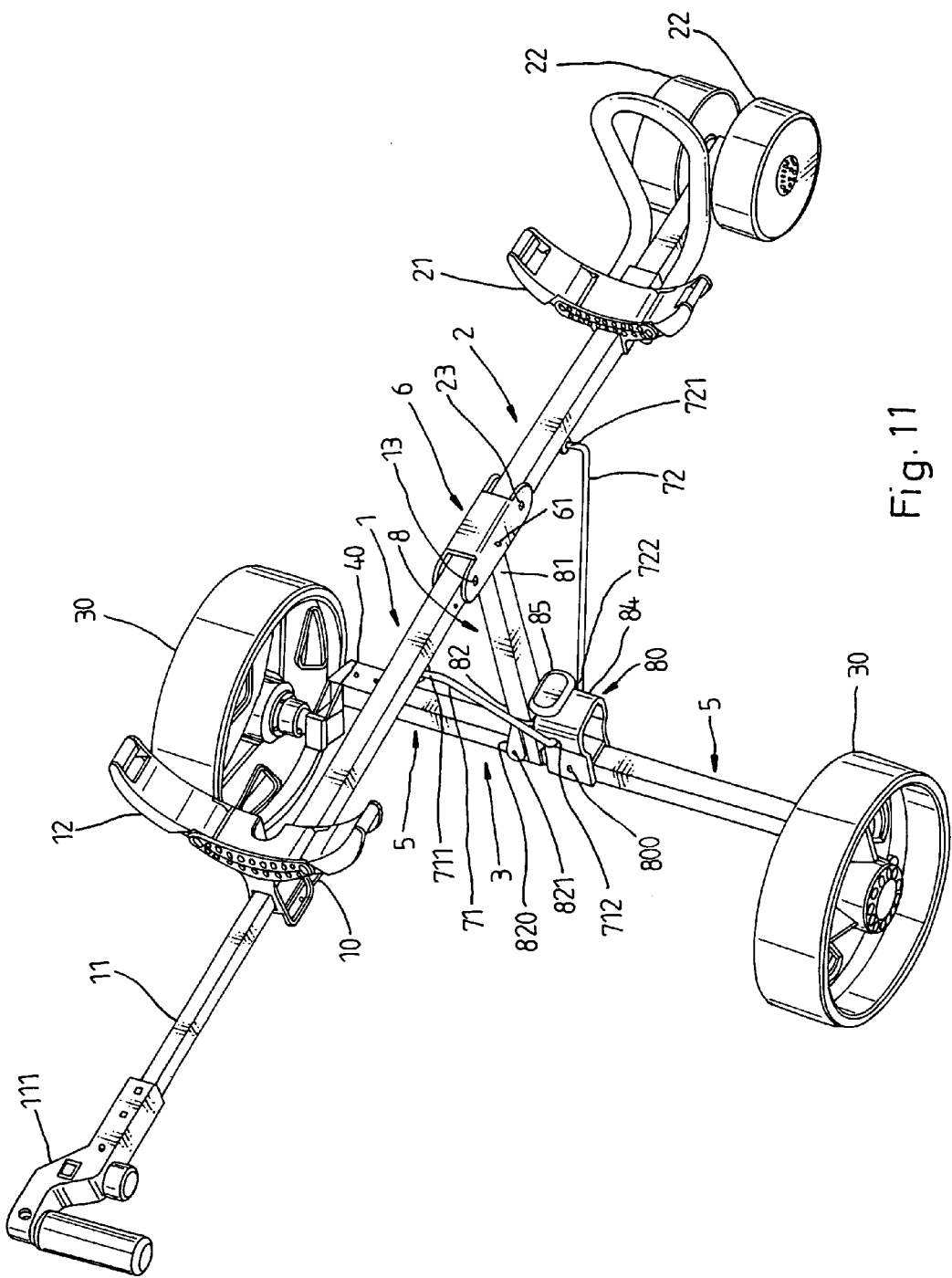
FIG. 11 is a perspective view of an alternate form of the present invention.

FIG. 11 shows an alternate form of the present invention. This embodiment eliminates the aforesaid connecting blocks, front wheel assembly, motor drive, and wheel axle, and has two wheel holders 40 respectively provided at the two distal ends of the bottom frame 5 to hold the wheels 30.

As indicated above, the invention has the following advantages:

1. When released from the locking device 80, the folding-control rod member 8 can then be received to the bottom frame 5, for enabling the upper and lower main shafts 1 and 2 and the links 71 and 72 to be turned downwards and received to the folding-control rod member 8 and the bottom frame 5.

2. When folded up, the collapsed golf cart requires less storage space, convenient for carrying. Because the major parts of the golf cart are received in between the wheels 30 when collapsed, the collapsed golf cart can conveniently be packed for delivery.

3. The folding design of the present invention is applicable to a motor-driven golf cart as well as a hand-push type golf cart.

What is claimed is:

1. A folding collapsible golf cart comprising:
    a) a hollow upper main shaft;
    b) a handle having a grip located on a first end thereof and a second end slidably inserted into a first end of the hollow upper main shaft and selectively locked in a predetermined position by a lock located on the first end of the hollow upper main shaft;
    c) an upper bag cradle connected to the hollow upper main shaft;
    d) a lower main shaft;
    e) a coupling frame pivotally connected at a first end thereof to a second end of the hollow upper main shaft and at a second end thereof to a first end of the lower main shaft;
    f) a bottom frame;
    g) two wheels, one of the two wheels is located on each of two opposing ends of the bottom frame;
    h) a lower bag cradle connected to a second end of the lower main shaft;
    i) a folding-control rod member pivotally connected at a first end thereof to a middle portion of the coupling frame and at a sliding lug of a second end thereof to a middle part of the bottom frame, the folding-control rod member being movable between folded and extended positions;
    j) a locking device connected to the middle part of the bottom frame, the folding-control rod member being selectively secured in and released from the extended position by the locking device;
    k) an upper link pivotally connected at a first end thereof to the hollow upper main shaft and at a second end thereof to a first side of the locking device; and
    l) an lower link pivotally connected at a first end thereof to the lower main shaft and at a second end thereof to a second side of the locking device,
    wherein, when the folding-control rod member is located in the extended position, the first end of the folding-control rod member is pivoted to a position extending outwardly from the bottom frame and the hollow upper main shaft is extended by the upper link and the lower main shaft is extended by the lower link, and, when the folding-control rod member is located in the folded position, the first end of the folding-control rod member is pivoted toward a predetermined one of the two opposing ends of the bottom frame and the hollow upper main shaft is retracted by the upper link and the lower main shaft is retracted by the lower link.

2. The folding collapsible golf cart according to claim 1, wherein the folding-control rod member having a locating device being a cylindrical member having a locating groove located around an outer circumference thereof, the locking device including:
    a) a casing fixedly connected to the bottom frame;
    b) a control button slidably inserted into a sliding slot of the casing; and
    c) a locking plate controlled by the control button and having a engagement device engaging the locating groove when the control button moves outwardly from the casing and separating from the locating groove when the control button is moves inwardly into the casing.

3. The folding collapsible golf cart according to claim 1, further comprising two connecting blocks, an axle, and a motor drive, each of the two connecting blocks having a top end and a bottom end; the top end of one of the two connecting blocks is fixedly connected to each of two opposing ends of the bottom frame, the axle is inserted through each bottom end, and one of the two wheels is connected to each of two opposing ends of the axle.

4. The folding collapsible golf cart according to claim 1, further comprising two wheel holders, one of the two wheel holders is connected to each of two opposing ends of the bottom frame, one of the two wheels is connected to each of the two wheel holders.

5. The folding collapsible golf cart according to claim 1, further comprising a front wheel assembly connected to the second end of the lower main shaft.

\* \* \* \* \*